Figure 1:
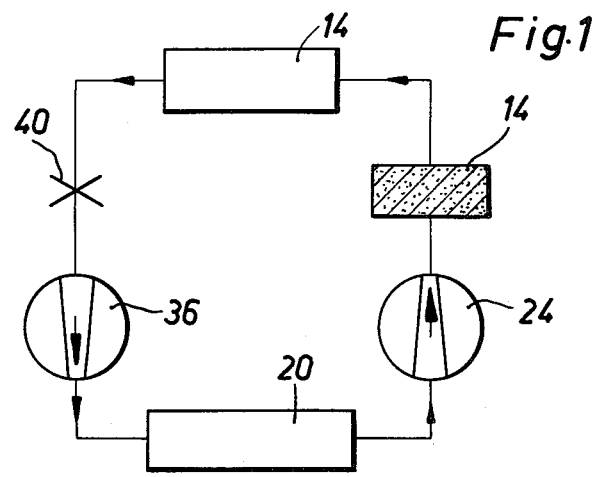

United States Patent [19]

Andres et al.

[11] 4,365,851

[45] Dec. 28, 1982

[54] LUBRICANT RECIRCULATION SYSTEM FOR THE BEARING OF A ROTATING SHAFT

[75] Inventors: Helmut Andres, Kiel; Karl-Heinz Fichtner, Strande; Hans-Siegfried Fisher, Kiel, all of Fed. Rep. of Germany

[73] Assignee: Anschutz & Co., GmbH, Kiel-Wik, Fed. Rep. of Germany

[21] Appl. No.: 204,363

[22] PCT Filed: Dec. 14, 1979

[86] PCT No.: PCT/DE79/00146
§ 371 Date: Aug. 15, 1980
§ 102(e) Date: Jul. 22, 1980

[87] PCT Pub. No.: WO80/01304
PCT Pub. Date: Jun. 26, 1980

[30] Foreign Application Priority Data

Dec. 15, 1978 [DE] Fed. Rep. of Germany ....... 2854298

[51] Int. Cl.³ ............................................. F16C 33/66
[52] U.S. Cl. .................................. 308/187; 308/240; 308/243
[58] Field of Search ............... 308/187, 243, 132, 125, 308/122, 240

[56] References Cited

U.S. PATENT DOCUMENTS

| 1,705,281 | 3/1929 | Bott | 308/187 |
| 3,915,519 | 10/1975 | Lautner et al. | 308/132 |
| 3,944,304 | 3/1976 | Purtschert | 308/122 X |
| 4,181,379 | 1/1980 | Letts | 308/187 |
| 4,241,959 | 12/1980 | Frister | 308/187 |

FOREIGN PATENT DOCUMENTS

| 2609736 | 9/1977 | Fed. Rep. of Germany | 308/187 |
| 719053 | 11/1954 | United Kingdom | 308/187 |

*Primary Examiner*—Stuart S. Levy
*Assistant Examiner*—Daniel P. Stodola
*Attorney, Agent, or Firm*—Frishauf, Holtz, Goodman & Woodward

[57] ABSTRACT

In order to prevent the occurrence of friction and attendant wear of the device for returning the lubricant from a porous body forming a lubricant reservoir to a bearing surface, a circumferential slot is formed bounded on one side by a helically grooved surface (32) adjoining the bearing surface and rotating with the shaft (10, 18) forming a pump and on the other side by a porous surface of the porous lubricant reservoir (14, 16) which thus does not touch the bearing parts (20–24) rotating with the shaft (10, 18). The slot (36) preferably narrows in the direction of rotation, and the slot (36) is widened into axially extending chambers (38) distributed along its circumference.

8 Claims, 8 Drawing Figures

U.S. Patent   Dec. 28, 1982   Sheet 4 of 4   4,365,851

LUBRICANT RECIRCULATION SYSTEM FOR THE BEARING OF A ROTATING SHAFT

The invention relates to a lubricant recirculation system for the bearing of a rotating shaft, utilizing a slinger disk, and having a lubricant reservoir surrounding the periphery of the slinger disk.
The lubricant reservoir can be made of a porous material, e.g. a sintered metal, but also of a non-metallic material, such as a felt-like fiber.

BACKGROUND

Bearings of the type described can be constructed so as to minimize or eliminate the loss of lubricant from the system and hence avoid a lack of lubrication, so that the bearing does not require maintenance during a very long operating time. Such bearings are wear-resistant and reliable, because they are lubricated sufficiently throughout their entire life. An additional advantage is that the lubricant is largely distributed in a manner which can be calculated in advance and is independent of acceleration, thereby leaving the center of mass of the shaft and the housing in its original position. Because the lubricant flows through the porous lubricant reservoir in its recirculation, the lubricant is continually filtered, so that no contamination which might cause wear reaches the bearing area. The lubricant reservoir can be made coaxial with the bearing.

A known bearing of this type (German Patent Disclosure Document DE-OS 26 09 736) has a wick serving as the device which carries the lubricant from the reservoir to the bearing surface. The wick can, if suitable, be formed by the reservoir itself, and touches the surface rotating with the shaft, thereby constantly brushing lubricant onto the surface. However, every wick contains dust and, in some cases, still other types of contamination. Further contamination develops due to the abrasion to which the wick is subjected by the surface which it brushes.

Even when the friction between the wick and the surface which it contacts is very slight, and the wick is hence subjected only to slight wear, the life time of the bearing is limited by wear of the wick.

THE INVENTION

It is an object to so construct the apparatus conducting the lubricant from the lubricant reservoir to the bearing surface in such a manner that no friction and hence no wear are produced while retaining the previously cited advantages of the bearing.

Briefly, according to the invention, the device conducting the lubricant from the lubricant source or reservoir to the bearing surface has a slot which is bounded on one side by a surface rotating with the shaft and adjoins the bearing surface, and on the other side by a porous surface of the lubricant reservoir. The porous surface does not touch the bearing components rotating with the shaft. The slot thus represents a dynamic pump. The system includes the above mentioned features as well as the features listed below, either individually or in a combination: (a) the slot tapers in the direction of the rotation and (b) the slot is widened to form chambers at one or several positions along its circumference.

Within the slot, lubricant is sucked out of the porous surface of the lubricant reservoir defining the outside of the slot and thence reaches the bearing surface. The above described features have the effect of creating a reduced pressure within the slot.

Figure 2:
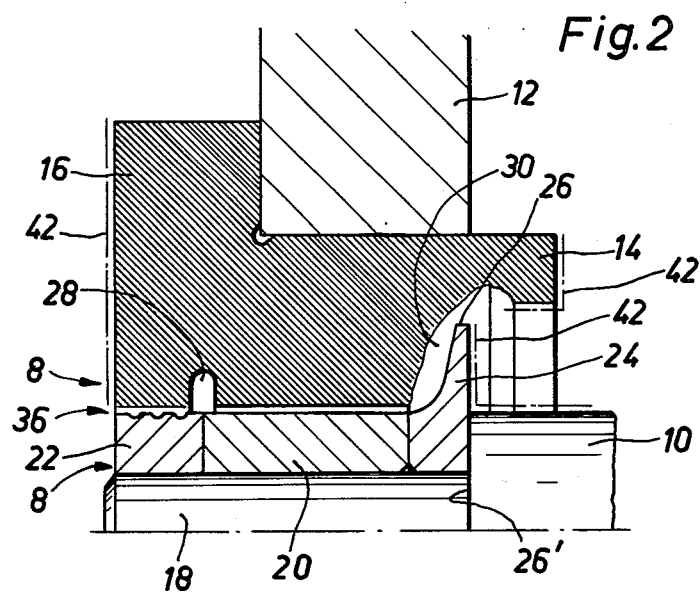
Figure 3:
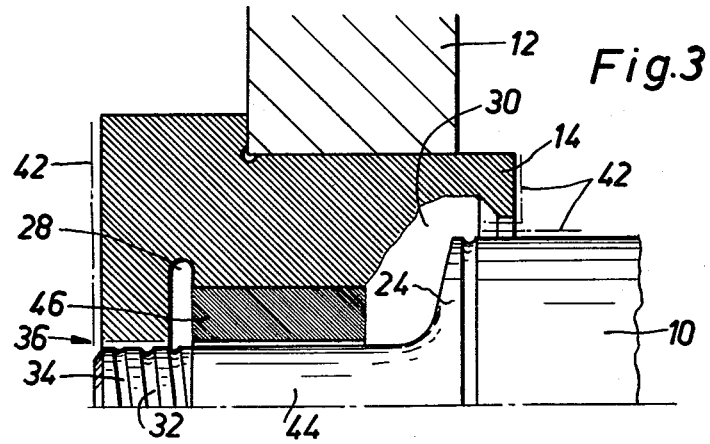
Figure 4:
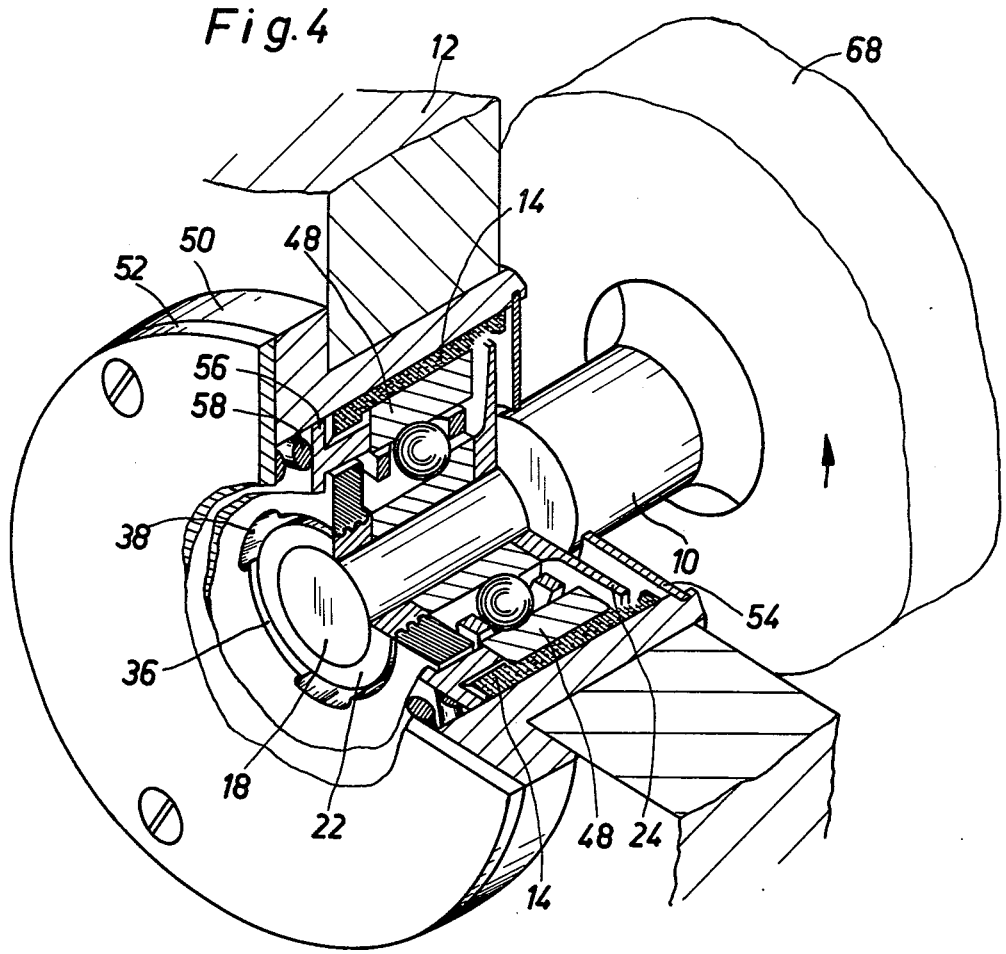
Figure 5:
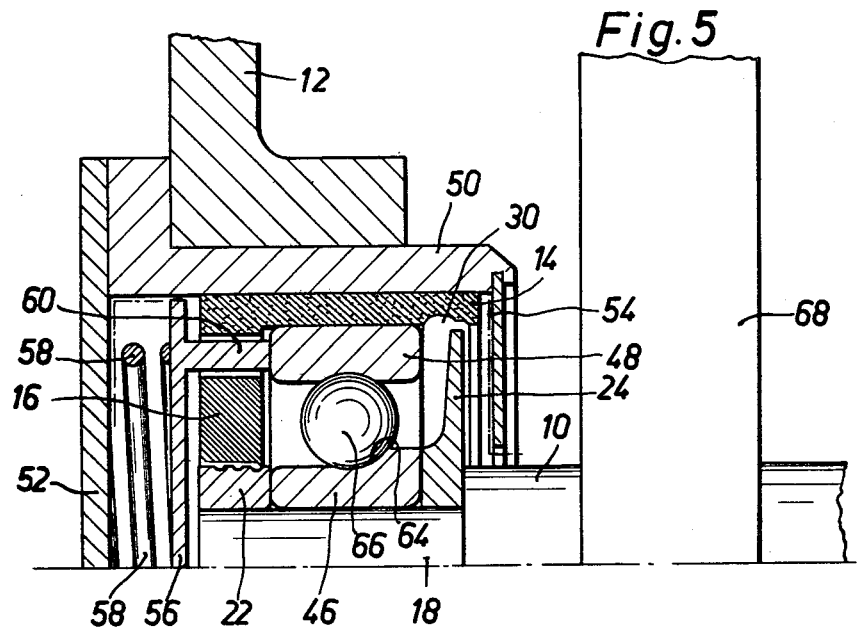
Figure 7:
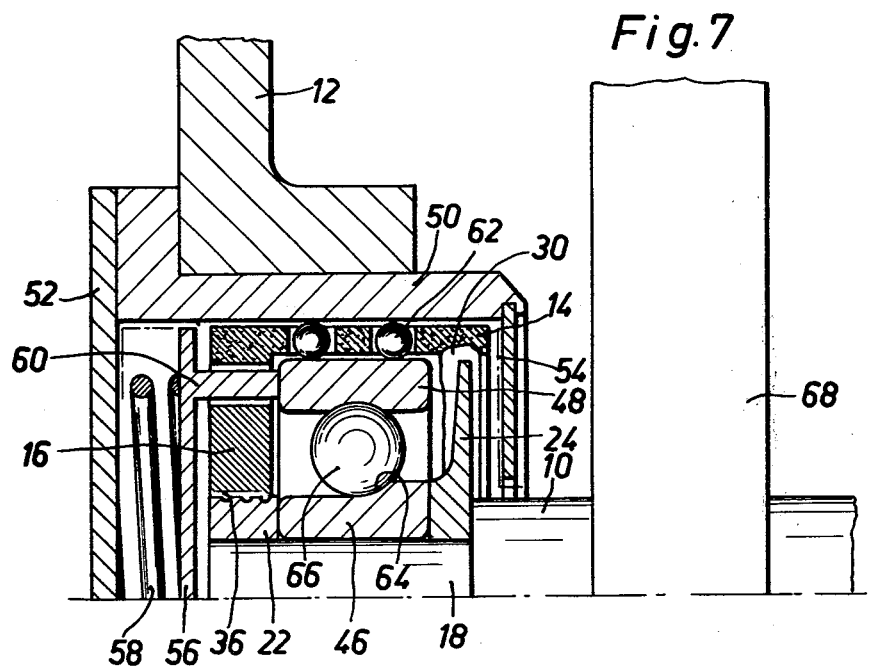
Figure 6:
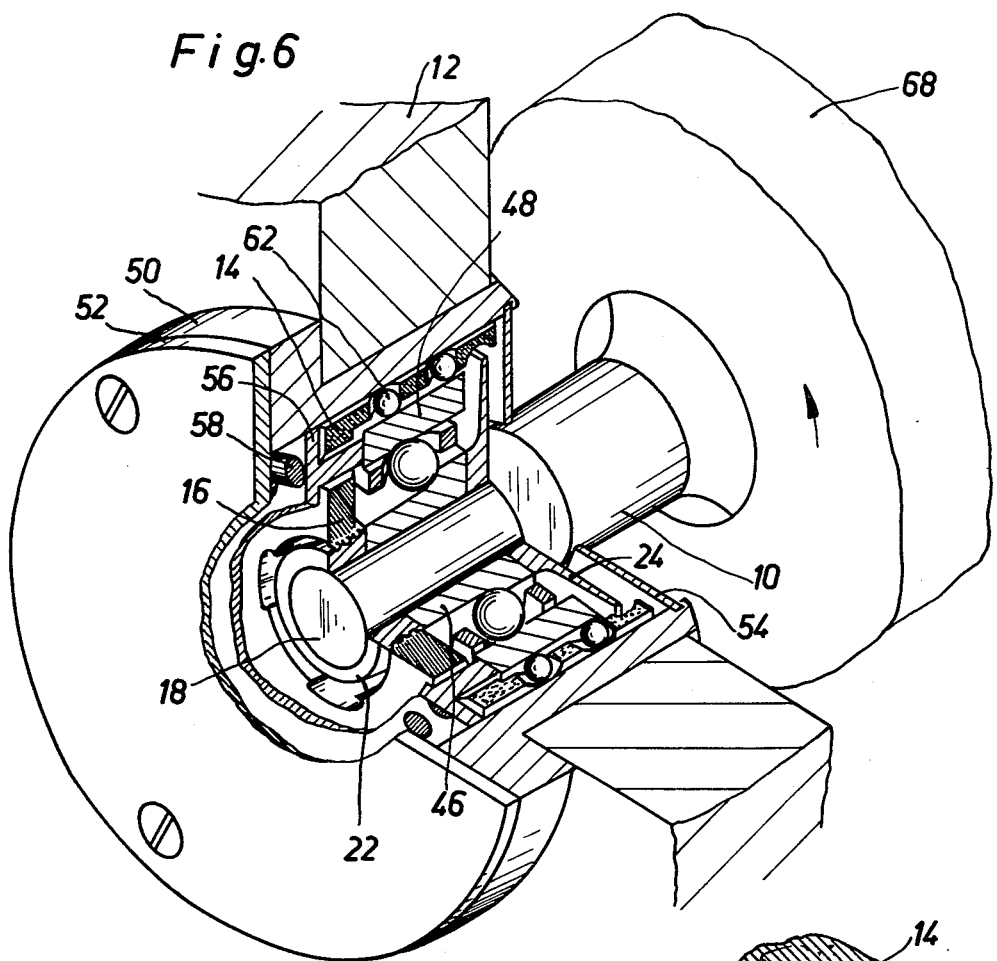
Figure 8:
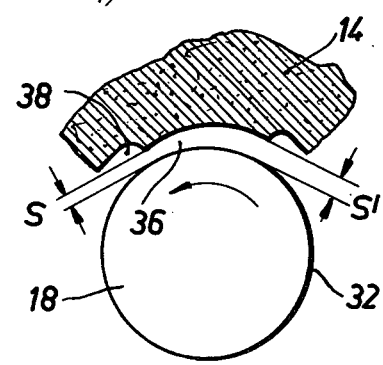

Drawings, illustrating exemplary embodiments:

FIG. 1 is a block diagram of the lubricant recirculation path,

FIG. 2 is a longitudinal section through a sleeve bearing having the above mentioned configuration, FIG. 3 is a longitudinal section through a similar sleeve bearing equipped with a commercially available sintered bearing, FIG. 4 is a perspective sectional representation of a ball bearing having the above-cited configuration, FIG. 5 is a longitudinal section through the ball bearing depicted in FIG. 4, FIG. 6 is a perspective sectional view of a ball bearing configured in the manner cited above and having a loose outer race, FIG. 7 is a longitudinal section of the ball bearing depicted in FIG. 6, and FIG. 8 is a partial side view of the bearing depicted in FIG. 2 as seen in the direction of the arrows 8, and illustrating the slot.

The sleeve bearing, shown in FIG. 2, of a horizontal shaft 10 serves to support the left end of this shaft in a vertical housing wall 12. The housing wall 12 has a round cutout through which the shaft passes and which contains a lubricant reservoir in form of a sleeve 14 surrounding the shaft. The sleeve 14 is constructed of material giving it the function of a lubricant reservoir. The reservoir-sleeve 14 has a flange 16 abutting the housing 12 at one of its sides. A bearing sleeve 20, a ring 22 of equal outer diameter, and a centrifugal sling disk 24 are attached by a force fit to an end spindle 18 of the shaft 10. The sling disk 24 forms an edge 26 at the outside, and this edge has a substantially greater outer diameter than the shaft 10. The three machine parts 20 to 24 lie in contact with one another and with the shoulder 26' of the shaft 10. The free side face of the ring 22 lies in the same transverse plane as the free face of the flange 16.

The sleeve 14 consists of a hard, porous, and absorbent material, for example of a sintered material, for example a metallic, ceramic, or synthetic material. The sleeve 14 has a shallow internal annular groove 28 opposite the junction between the ring 22 and the bearing sleeve 20. The sleeve 14 also has a deep annular groove 30 into which the sling disk 24 penetrates without, however, touching the wall of the annular sleeve 30.

The outer circumferential surface 32 of the ring 22 has a helical groove 34, shown in FIG. 3, and forms an annular slot 36 in conjunction with the inner circumferential surface of the sleeve 14. The slot 36 is profiled in the manner depicted in FIG. 8. As shown, the slot 36 is widened into whirl chambers in the inner wall of the sleeve 14 by means of the axially parallel grooves 38. In the depicted exemplary embodiment, three such grooves are distributed along the circumference of the inner sleeve surface; however, this number can be increased or decreased as desired. The slot 36 tapers and narrows between any two neighboring grooves 38 in the direction of rotation of the shaft 10 indicated by the arrow.

The sleeve 14 with its flange 16 (FIG. 2) is impregnated with a lubricant, and forms a lubricant reservoir. The interior of the bearing, i.e. the slot 36 and the grooves 28 and 30, is also filled with lubricant.

OPERATION:

During rotation of the shaft 10, the shaft carries the lubricant along and thereby creates a strong flow in the slots and grooves 36, 38. Because the cross sectional size of the lubricant current narrows, the pressure in the slot decreases. It has been found that such a pressure decrease occurs even when the slots 36 have a constant width over their entire lengths, provided that the grooves or chambers 38 are of sufficiently large dimensions. However, an under pressure develops, or suction even without such grooves, when the surface 32 rotating with the shaft and adjoining the bearing surface has at least one helical groove 34 within which the lubricant can flow along a helical path.

The suction pulls lubricant out of the pores of the inner surface of the reservoir formed by the sleeve 14. The lubricant reaches the groove 28 and thence the bearing surface formed by the circumference of the sleeve 20. When the shaft 10 rotates in the direction indicated by the arrow in FIG. 8, the pitch of the groove 34 should constitute a right hand thread, as shown in FIG. 3. Because this circumferential surface 32 moves faster, in the direction of the arrow of FIG. 8, than does the lubricant flowing in the slot, the lubricant tends to lag and therefore flows in the groove 34 in the direction toward the bearing sleeve 20. On the bearing sleeve 20, the lubricant film wanders to the right relative to FIG. 2, while it is continually fed from the left, and finally reaches the outer surface of the sling disk 34 whence it is thrown off in the form of droplets from the edge 26 of the disk 24 on the inner surface of the groove 30.

The reservoir formed by the sleeve 14 and its flange 16 preferably has a non-porous external surface which can be formed by an applied layer which excludes only the inner surface of the flange 16 surrounding the ring 22 and the inner surface of the groove 30. The lubricant thrown off the centrifugal sling disk 24 is therefore sucked up by the porous inner surface of the groove 30.

The result is a lubricant recirculation system which is depicted schematically in FIG. 1, and which encompasses the lubricant bearing surface rotating with the shaft 10 (circumferential surface of the bearing sleeve 20), the adjoining surface of the sling disk 24 rotating with the shaft 10, the lubricant reservoir formed by the sleeve 14 and surrounding the circumference of the sling disk 24, and the device which returns the lubricant from the reservoir to the bearing surface. This device is formed by the slot 36, and is bounded on one side by the surface 32 adjoining the bearing surface and rotating with the shaft 10, and on the other side by the sleeve 14 forming the porous inner surface of the lubricant reservoir. Because this lubricant reservoir, in the form of the sleeve 14, is separated from the ring 22 by the slot 36, and from the bearing sleeve 20 by the lubricant film, no contact exists between this reservoir and the shaft 10, 18. Because the lubricant is constantly filtered as it flows through the reservoir sleeve 14, 16 and hence contains no contaminants, a practically unlimited operating life is obtained.

Lubricant recirculation is initiated and maintained by the rotation of the shaft, without direct mechanical contact, the centrifugal sling disk 24 and the slot 36 acting as pumps. It is recommended to make the dimension S' twice as large as S (FIG. 8); for example, to let "S'" equal 0.035 mm, when S equals 0.07 mm.

The flow rate of the circulating lubricant current can be variously adjusted for any given dimensions and rotational velocity by configuring the porous inner surface of the lubricant reservoir 14, 16 (surrounding the surface 32) in such a manner that it acts as a throttle for the lubricant current. This surface can be decreased by applying a suitable coating or the degree of porosity can be reduced. This is represented schematically in FIG. 1 by the throttle 40.

In the absence of special precautions, a small loss of lubricant could occur due to creep of the lubricant from the groove 38 and from the slot 36 to the outside, and from the edge 26 toward the outer side of the sling disk 24 and the shaft 10. In order to prevent this loss, it is recommended that the surfaces on which the lubricant could creep out of the bearing be equipped with repellent layers which are indicated in FIG. 2 by the dash-dotted lines 42.

The embodiment depicted in FIG. 3 differs from the one of FIG. 2 in that the elements 18 to 24 consist of a single piece forming the end spindle 44, and in that a commercially available bearing sleeve 46 is force-fitted into the sleeve 14 between the grooves 28 and 30 and, together with the end spindle 44, forms the bearing surface for the shaft 10.

The embodiment of FIGS. 4 and 5: using a ball bearing: the shaft 10 carries the sling disk 24 and a ring 22 equipped with a helical groove. The shaft 10 is surrounded by sleeve 14 consisting of a porous material and has flange 16 carried by housing wall 12.

A ball bearing has an inner race 46 which is set into the position of the bearing sleeve 20 of FIG. 1, and whose outer race 48 is carried by the porous sleeve 14. A sleeve 50 is force fitted into the housing wall 12 and has a lid 52 attached to its left side. It is located between the sleeve 14 and the housing wall 12 and the lid 52 closes off the bearing. At the right side, the sleeve 50 carries an annular disk 54 (FIG. 5) oriented parallel to the lid 52, and the sleeve 50 is flanged around the circumference of the disk 54. The disk 54 surrounds the shaft 10 with clearance. A disk 56, which, together with the lid 52, defines a chamber containing a pretensioned spiral compression spring 58, is located between and parallel to the lid 52 and the flange 16. The right side of the disk 56 carries axially parallel studs 60 which penetrate clearance holes in the flange 16 and which abut the left side wall of the outer race 48 of the ball bearing. The outer race 48 is fitted into the sleeve 14 without clearance; the sleeve 14 must transfer any transverse forces occurring between the sleeve 50 and the outer race 48, and hence must consist of a suitably rigid and sturdy material, e.g. a sintered metal.

The inner race 46 of the ball bearing has a shoulder 64 against which the balls 66 of the ball bearing are pressed by the pretensioned spring 58, the disk 56, the studs 60 and the outer ball bearing race 48.

The shaft 10 carries a flywheel 68. The disk 56 with the studs 60 forms a pressure piece penetrating the holes in the flange 16 and pressing onto the outer race 48. The shoulder 64 has a larger diameter than the surface of the ring 22 delimiting the slot 36 on the inside.

The sleeve 14 forming the lubricant reservoir is subjected to mechanical forces, and hence must consist of a correspondingly sturdy material. The embodiment illustrated in FIGS. 6 and 7 permits relief of the sleeve 14 and its flange 16 from mechanical forces, and hence can be made of a porous material of low strength, e.g. a synthetic sintered material or a hardened fabric. This is accomplished by providing the sleeve 14 with two sets of holes between the outer bearing race 48 and the sleeve 50 and by placing force-transmitting elements, e.g. balls 62, into these holes to make contact with the outer race 48 and with the sleeve 50. The sleeve 14 thus forms a kind of cage for the balls 62. The balls 62 can be radially pre-stressed, which offers the advantage that the bearing operates entirely without play. In spite of the absence of clearance, the spring 58 needs to exert only a very small force in order to take up any axial slack.

In all other aspects, the embodiment of FIGS. 6 and 7 agrees with those of FIGS. 4 and 5. It also agrees with the embodiment of FIGS. 2 and 3 with respect to the lubricant recirculation system in particular with respect to the device for returning the lubricant from the reservoir to the bearing surface. The disk 54 (FIGS. 5, 6, 7) serves to catch spattered lubricant.

In all of the embodiments according to FIGS. 2 to 7, the lubricant is distributed in a predeterminable manner that is independent of acceleration, so that the lubricant does not wander so that the center of mass of the shaft and of the housing remains in its position. The lubricant flushes the bearing thoroughly and removes contaminants.

The above-described exemplary embodiments can be altered in various ways. Thus it is possible to form the lubricant reservoir from porous fillings of a set of axial bores in the housing and the sleeve 50; these fillings abut the porous flange 16 and with it form the feed path for the lubricant. The surfaces delimiting the slot may also be conical or flat and parallel and oriented perpendicular relative to the shaft, although the construction shown in the drawing is preferred.

The screw-like groove 34 causes a suction effect in the slot 36 even if the chambers or grooves 38 are absent, and if the width of the slot 36 is constant over the entire circumference. The dynamic pump effect is then produced solely by the thread-like groove 34. Finally, parts which are depicted as separate parts in the drawing, for example the parts 22 and 46 in FIG. 5, can consist of a single piece.

We claim:

1. A lubricant recirculation system for a bearing of a rotating shaft (10, 18) having
    a lubricating surface rotating with the shaft;
    a slinger disk (24, 26) adjoining the surface rotating with the shaft;
    a lubricant reservoir (14, 16) comprising porous material at least in part surrounding the circumference of the slinger disk;
    and means for returning the lubricant from the reservoir to the bearing surface,
    wherein, the means for returning the lubricant from the reservoir to the bearing surface includes a surface formed on said porous material lubricant reservoir (14, 16) in alignment with a surface rotating with the shaft and axially adjoining the bearing surface, said surface on the porous material lubricant reservoir being spaced from the bearing (20-24) rotating with the shaft (10, 18) and defining a slot (36) therebetween, so that said slot (36) will be bounded on one side by a surface (32) axially adjoining the bearing surface rotating with the shaft and on the other side by a porous surface of the porous material lubricant reservoir (14, 16);
    said slot (36) forming, upon rotation of the shaft, a pumping chamber of a dynamic pump transporting lubricant from the reservoir to said bearing part, the slinger disk supplying the lubricant, which has passed through the bearing (20-24) back to the porous material lubricant reservoir, for recirculation by said dynamic pump;
    wherein the bearing is a ball bearing
    and the porous lubricant reservoir (14) is shaped as a cage bounding the slot on the outside and
    the cage (14) forming the lubricant reservoir includes guiding balls (62) therein, the lubricant reservoir cage being located between the outer race (48) of the ball bearing, on the shaft (10) and the housing (12), the inner race of the ball bearing being positioned on the shaft (10)
    and wherein the lubricant reservoir (14) shaped as the cage (14) has a flange (16) which is located adjacent to said ball bearing and which has an inner surface delimiting the slot (36).

2. A lubricant recirculation system according to claim 1, including a spring (58) supported at the housing (12, 50, 52) to act on a pressure piece (56, 60) located between the spring and a flange (16) formed on the cage (14);
    the pressure piece (56,60) having penetrating holes formed in the flange (16) and pressing on the outer race (48) of the ball bearing; the inner race (46) of the ball bearing being provided with a shoulder (64) abutting the balls (66), of a greater diameter than the surface (32) delimiting the slot (36) on the inside.

3. A lubricant recirculation system according to claim 1, wherein
    the lubricant reservoir is formed by a sleeve (14) of porous material located between the outer race (48) of the ball bearing and the housing (12, 50, 52),
    and the sleeve (14) delimits the outside of the slot (36) by means of the inner surface of a flange (16) formed on the sleeve (14).

4. A lubricant recirculation system according to claim 1 wherein
    the lubricant reservoir is formed by a sleeve (14), the exterior surface of the sleeve (14) being non-porous, in regions remote from the surface of the slot (36) and of the surfaces surrounding the centrifugal slinger disk (24).

5. A lubricant recirculation system according to claim 1 wherein the slot (36) narrows and tapers in the direction of rotation of the shaft.

6. A lubricant recirculation system according to claim 1 further including at least one axially extending groove (38) formed in the porous surface of the porous material reservoir body adjacent the slot, said at least one groove forming a portion of said pumping chamber of the dynamic pump.

7. A lubricant recirculation system according to claim 6 wherein the slot narrows in the direction of rotation of the shaft, starting from a wider portion beginning at one side of said at least one groove, and terminating in a narrow portion at the other side of the next groove (38).

8. A lubricant recirculation system according to claim 1 wherein the slot (36) at the shaft side, is bounded by a spiral surface (34) rotating with the shaft (10) to form a spiral pump in cooperation with the facing surface of the porous reservoir (14).

* * * * *